United States Patent
Turner

(10) Patent No.: US 7,853,000 B2
(45) Date of Patent: *Dec. 14, 2010

(54) SYSTEM AND METHOD FOR INITIATING A CONFERENCE CALL

(75) Inventor: Tod C. Turner, Kenmore, WA (US)

(73) Assignee: Linqware, Inc., Kenmore, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/723,750

(22) Filed: Mar. 15, 2010

(65) Prior Publication Data

US 2010/0165888 A1 Jul. 1, 2010

Related U.S. Application Data

(63) Continuation of application No. 11/019,655, filed on Dec. 22, 2004, now Pat. No. 7,804,948.

(51) Int. Cl.
*H04M 3/56* (2006.01)
*H04L 12/18* (2006.01)

(52) U.S. Cl. .................. 379/204.01; 370/261; 455/416

(58) Field of Classification Search .................. 370/260, 370/261, 262, 264; 379/202.01–206.01; 455/416
See application file for complete search history.

(56) References Cited

U.S. PATENT DOCUMENTS

| 5,995,608 A | 11/1999 | Detampel, Jr. et al. |
| 6,856,809 B2 | 2/2005 | Fostick |
| 2002/0122391 A1 | 9/2002 | Shalit |
| 2003/0105820 A1 | 6/2003 | Haims et al. |
| 2006/0088152 A1 | 4/2006 | Green et al. |

*Primary Examiner*—Harry S Hong
(74) *Attorney, Agent, or Firm*—Connolly, Bove, Lodge & Hutz LLC

(57) ABSTRACT

The present invention is a system and method for initiating conference calls via an instant messaging system to reduce the effort required to initiate and manage the call. The system uses an IM connection between a requesting party and a conference call server to inform the conference call server of the desire to initiate the conference call. The conference call server may initiate the conference call by having involved parties called by a conference bridge, thus reducing the effort required by the parties to join the call.

23 Claims, 18 Drawing Sheets

FIG. 7

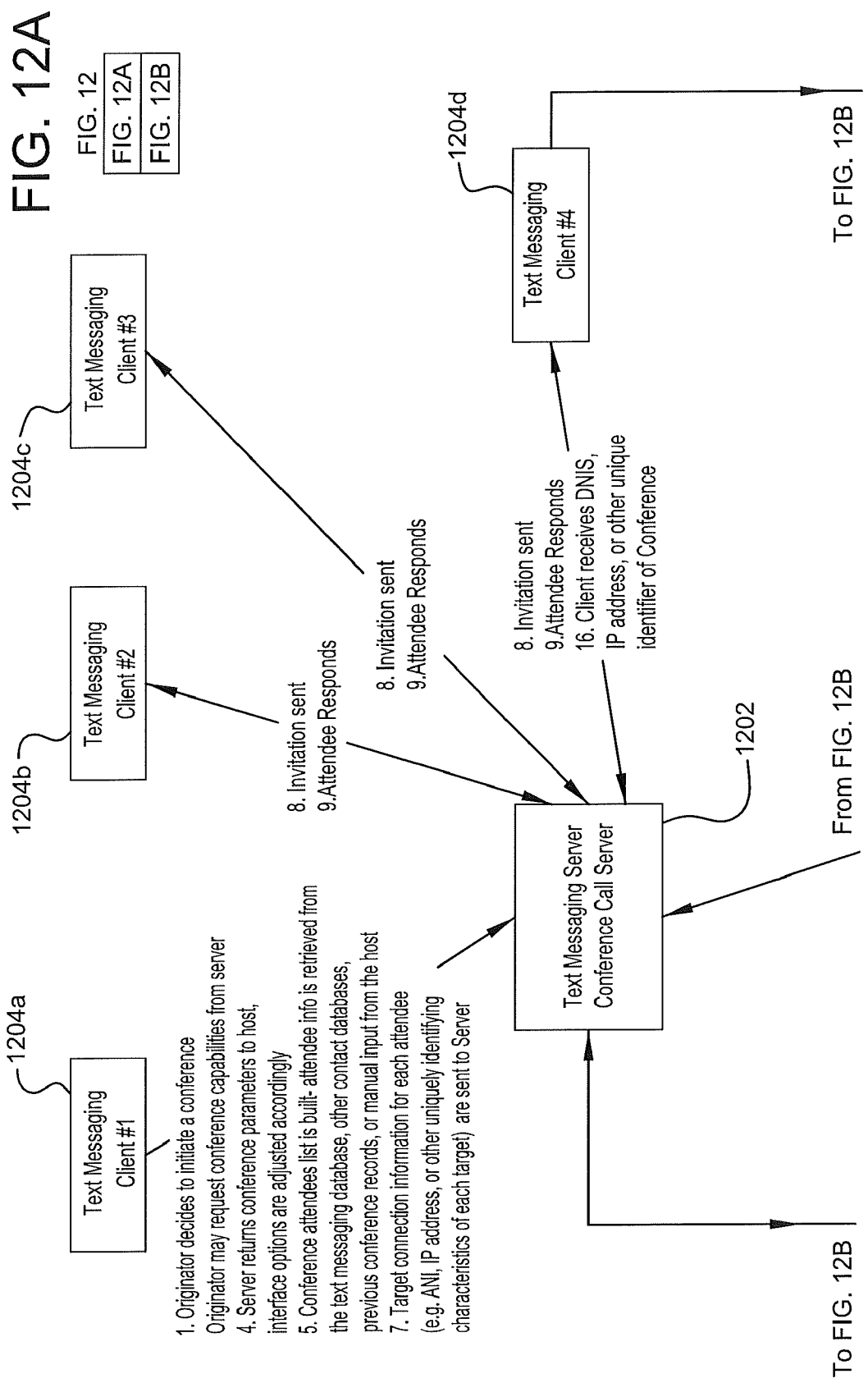

SYSTEM AND METHOD FOR INITIATING A CONFERENCE CALL

RELATED APPLICATIONS

The present application is a continuation of U.S. patent application Ser. No. 11/019,655, filed Dec. 22, 2004, which is a continuation-in-part of U.S. Provisional Patent Application Ser. No. 60/531,722 filed on Dec. 22, 2003, the entire contents of each of which are hereby incorporated by reference herein by reference thereto, respectively.

FIELD OF THE INVENTION

The present invention relates generally to a method for initiating a conference call between two or more users, and more particularly to initiating a voice conference call between two or more users using a central server to communicate parameters for the call and for initiating the call itself.

BACKGROUND

Business meetings where the differing perspectives of the participants provide the value of the meeting have been conducted for a long time. As the costs associated with travel have increased, companies have turned from face to face meetings to meetings allowing participants to be separately located, including telephone conferences, video conferences, and more recently through on-line meetings.

As traffic congestion grows in every part of the country, and software tools improve, companies worldwide are recognizing that it is possible to have effective meetings on-line. There are various forms of real-time, or on-line, collaboration. The simplest form is instant messaging. The ability of messaging software to tell another user who is available at a given moment is called "presence". Presence awareness has been proven to eliminate up to 35% of voicemail, and as much as 30% of email, particularly long threaded discussions. Because of this, instant messaging has become the fastest growing form of communication in history. Gartner predicts over 200 million business users will be using some form of enterprise instant messaging by the end of 2005, an increase of over 100 million users from 2003.

Instant messaging has its roots in the consumer industry, but is virally working its way into corporations. Consumer messaging systems typically offer no security, no IT control over usage, and no reporting capabilities. Nor do consumer systems offer tracking history of conversations, a requirement of a number of federal statutes, from the SEC to Sarbanes-Oxley to the new medical HIPPA requirements. There are no clear leaders in the corporate instant messaging market, although the opportunity has been recently showcased by the entrance of Microsoft and IBM.

Oftentimes, messaging leads to the requirement for one or more meetings with the participants. Historically this required travel, which lengthened the business processes and significantly increased costs. With the advent of various forms of desktop application sharing, it is now possible for multiple users to "see" the same desktop at the same time. This "real-time" collaboration market is just emerging, and is estimated by Collaborative Strategies to be about a $6 billion market, with an average annual growth rate of 64% through 2005, and is expected to add 20 million users to its ranks in the next several years.

In a recent Deloitte Consulting survey of 300 of the Fortune 1000, collaboration was top priority with 75% of respondents. While less than 30% were using some foil of collaborative tools today, 80% of respondents said they would implement some collaboration capability by 2005. According to a recent Yankee Group survey, companies will save $223 B over next 5 years by collaborating over the Internet.

Because of the size of this emerging opportunity, Microsoft recently acquired a company called Placeware, for $180 million, to provide software for on-line meetings. Placeware has been renamed and is now being offered by Microsoft, coupled with Windows 2003 server, as Microsoft Live Meeting. Microsoft internally calculates that they will save over $43 million this year alone in time and travel costs if just 1 in 5 meetings are conducted on-line. Microsoft will spend over $300 million this year promoting Live Meeting, and joins IBM with its Lotus Sametime product, WebEx, and another 3 dozen smaller competitors.

The commonality of all of the collaboration products is that once the users begin their on-line meeting, they use a number of tools. Many of them require some form of application sharing, and all of them require some form of accompanying communication, from instant messaging to conference calls. Although instant messaging is sometimes used for extended conversations, most of the time the discussions are brief. 'Conversations' between a number of participants that become more involved are dependent upon the typing skills of each participant, which leads to the need for everyone to join in a conference call.

Similarly, real-time collaboration products imply the need for a conference call. MS Live Meeting, IBM Lotus Sametime, WebEx, and a host of other software products all make an assumption that once you are sharing a document or spreadsheet, the users are on a conference call so they can discuss it. This brings real value to the meeting, yet the integration of the call into the collaboration process has not yet been addressed.

In the past, the problem with integrating telephony products into software has centered on integration with the PBX. In large part this is because the call initiator's computer needed to pass the various telephony commands to the PBX, and no two PBX's are alike. This requires system integrators, and up until now has reduced the scalability of the opportunity.

Furthermore, most PBX systems can only join a few users in a conference call. They cannot join many parties, leaving the originators the option of creating either a "meet me' or an operator assisted conference call. Because the users must typically dial a central number, such as a toll free number, and enter a passcode, it is difficult to make the calls spontaneous. Yet, the needs of both instant messaging and on-line meetings demand it.

A further concern arises regarding the security of a conference call using the call in model. Any caller knowing the call in number and passcode may enter into the conference call, without the knowledge of the other members of the call. Although it is possible for the call service to monitor the number of connections, the call service may be unable to ascertain the identity of callers, such as where the calling number is blocked. Furthermore, even if the identity of participants were disclosed to a call originator during a conference call, such information could be a distraction during the conference call.

Conference calls today fall into 2 categories:
1. "Meet Me" calls—These conference calls involve all users of the call dialing, via a publicly switched telephone network (hereafter "PSTN"), cellular telephone, or via a voice over internet protocol network, a central phone number or ANI to a conference bridge and entering a personal identification number (hereafter "PIN")

or pass code to join the call. These calls may be may be set up by an originating user by going to a web site to set up the call, through calling an operator and setting the call up, or setting up a static DNIS to which all users may dial on occasion.

2. Host-initiated Calls—These calls involve the host originating calls to all of the participants. In order to accomplish this, the host must initiate the call one of two ways:
 a) either the host enters an ANI on his telephone and through pressing a combination of buttons has that party joined to the call, and repeats this process for each conference call participant, or;
 b) the host types in the phone numbers of all the expected participants, either to a web site after which the web site will initiate a conference bridge and dial all the participants, or manually provides them to an operator who initiates the calls to the participants.

These methods are inefficient, in that they require a conference call requester or party to the conference call to manually inform either the parties to the conference call, or the conference bridge itself, of parameters, passwords, and phone numbers for the call.

Instant messaging (hereafter "IM") systems employ a client-server model on Internet protocol (hereafter "IP") networks to deliver text chat and other information to distributed users in real-time. Instant Messaging client software may be loaded onto a user's workstation or may be used in a web browser, and may allow a user to log into a remote Instant Messaging server. Once a user has logged in, business rules may be used to determine which other users are available to communicate with the first user in the instant messaging system. Many IM systems allow users to create lists of other users that they commonly communicate with. When a user in such a list logs into the IM system, the server informs the list owner that a user in their list has logged on and is available to chat. In addition, Instant Messaging systems provide directory services that permit the users to search for another user. Once a user has the address of a second user, the first user can request a collaborative chat session with the second user. The second user can choose to either accept or reject the chat session. After the session has been accepted, the users may be able to communicate in a private or public chat session by typing text messages to one another. The message can be either transmitted through a central server, or directly between users (peer to peer) once the first user has determined the availability of the second user from the IM system. These chat sessions may take place over an unsecured IP network. Further extensions of IM allow multiple participants to be involved in a chat session.

SUMMARY OF THE INVENTION

The present invention may use a communications channel established through an instant messaging service to transmit a request to initiate a conference call from a network access device associated with a conference call requester to a conference call server. The conference call server, upon receiving the request, may initiate the formation of a conference bridge a conference call between the conference call requester and one or more call participants.

In a first embodiment, the present invention may be embodied in a method for initiating a conference call, including the steps of providing a conference call server; providing a conference call requester with a network accessible device communicable with an instant messaging service; generating a conference call request by the conference call requester; transmitting the call request from the call requester to the conference call server; receiving the call request at the conference call server; parsing the conference call request to determine parameters associated with a requested conference call; and initiating a conference call in accordance with parameters associated with the requested conference call. The instant messaging service may be adapted to communicate conference call request information with the conference call server.

The present invention may further use the presence component of an instant messaging system to determine whether prospective attendees are available for a conference call through this presence with the instant messaging service, then using stored information that includes an address for a party, either through an IM channel or at a specific phone number or VOIP address, create the ability for instant messaging users to immediately create any combination of PSTN, Cellular, and VOIP conference calls between users some of whom may be in instant messaging sessions, and without the necessity of each user to dial a telephone number or having the host look up the phone number of each participant in order to place an outbound telephone call. The invention may collect, through a variety of means, the information needed to join those users into a telephone conference call, pass the dialing information and other parameters to a central server, and send an invitation to each participant in advance of placing the call. The central server may directly or indirectly establish a conference bridge, initiate a series of outbound calls to each of the selected users from the instant messaging session, and seamlessly join those users in a conference call using a conference bridge. Via the instant messaging service, the conference call initiator may be able to see, via presence awareness, whether one or more additional users with whom he wishes to conference are available, and may invite these users to the call either through similar means, or by passing information to those users about how to connect to a call. Optionally, and at the users discretion, the central server can also add a "silent" user which is a recording device, to the conference bridge, record the call, and at the conclusion of the call pass the recorded voice transcript back to the Instant Messaging Server for archiving purposes. Additionally, using the instant messaging interface and based upon the conference server capabilities, the call initiator may apply certain business rules to various participants in the call, such as muting or dropping that participant from the call, archiving the participants telephone numbers, call duration, and call set-up parameters.

FIGURES

FIG. 7 shows a notional network access device display identifying parameters associated with a potential target for a conference call initiated according to the present invention.

DETAILED DESCRIPTION

The following definitions are provided to more readily describe the present invention, and are not intended to limit the scope of the claims:

Access Authorization is the means by which a connection and/or request for service is authenticated to permit a party to access a service. There are many ways to authenticate a user, including, but not limited to, sign on ID's and passwords, digital signatures, electronic keycards, and biometric devices.

A Network Access Device (hereafter "NAD") is any device capable of communicating over a network to one or more other Network Access Devices using a common protocol. Such NADs can include but are not limited to computers, servers, workstations, Internet appliances, terminals, hosts, personal digital assistants (hereafter "PDAs"), and digital cellular telephones.

Encryption is the transformation of data into a form that cannot be read or understood without the use of a decryption algorithm. The purpose of encryption is to minimize the ability of third parties (who are not desired to participate in a conference call) to understand the contents of a message.

Decryption is the reverse of encryption; it is the transformation of encrypted data back into a readable form.

Address—This is the identifier for where a participant to a conference call may be contacted, and may be, but is not limited to, a PSTN or cellular phone number, such as an ANI, or a unique identifier associated with a voice over Internet protocol communications path.

ANI—Automatic Number Identifier—This is the direct phone number of a call participant, and is typically the number at which a person may be directly dialed.

Conference Bridge—Switching circuitry used to interconnect two or more communications paths connected to participants to allow simultaneous conversations between the participants.

Conference Call—A communication between two or more parties who are disparately located, using a connection allowing the transmission of audible, verbal, or visual data, or a combination thereof, including videoconferencing in which participants are visible to other participants as well as able to verbally communicate with each other.

PSTN—The voice networks are referred to as a publicly switched telephone network (PSTN) and its related services.

VOIP—Voice over Internet Protocol

Figure 1:
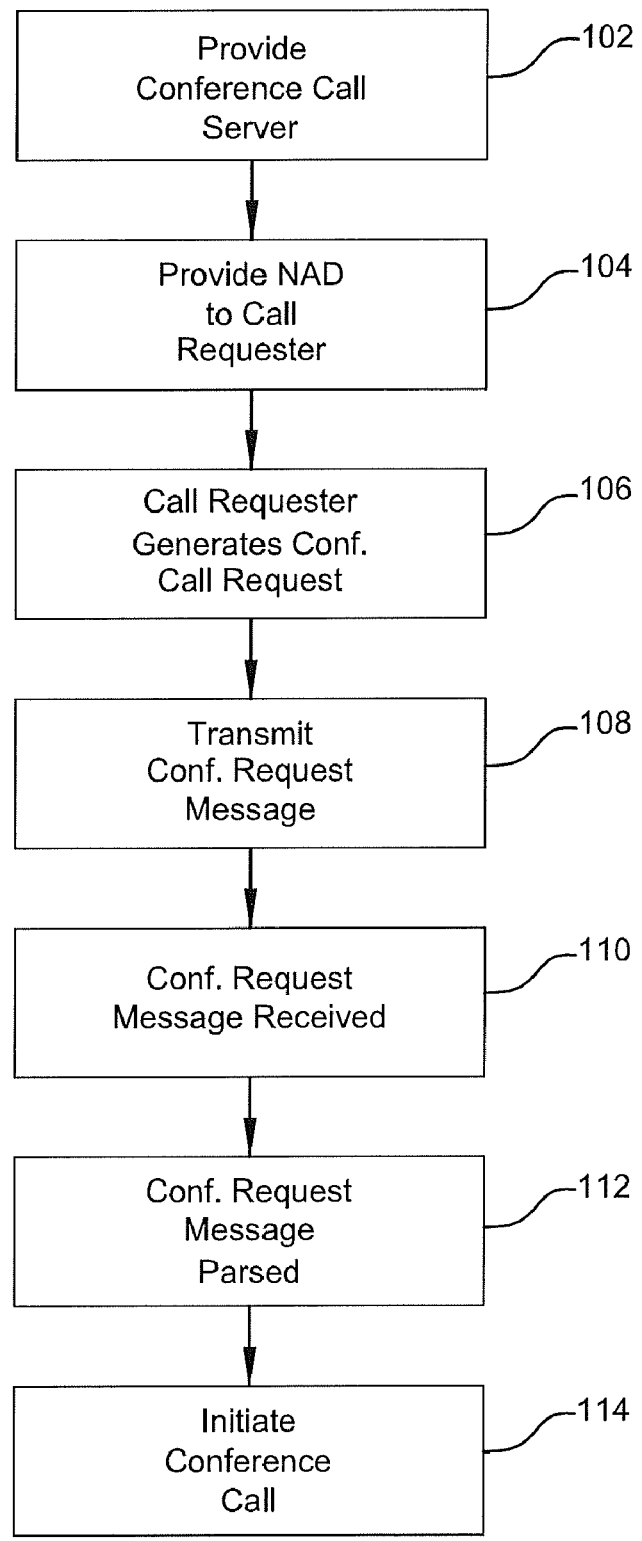
FIG. 1 shows a flowchart of the initiation of a conference call according to the present invention.

As shown in FIG. 1, the core of the present invention is the use of instant messaging to trigger initiation of a host initiated conference call. The first step is providing 102 a conference call server. The conference call server may be connected to a network, such as an Internet protocol based network. The conference call server may have the ability to receive instant messenger messages requesting initiation of a conference call. The conference call server may have one or more ports for connecting participants, such as by a VOIP path, or through a telephonic network. Connection of two or more paths allows the formation of a conference bridge. Alternately, the conference server may have stored information identifying one or more conference bridges discrete from the conference server, such as conference bridge capabilities provided by one or more third party vendors.

Next, a first party, hereafter referred to as the conference call requester, may be provided 104 with a network access device (hereafter "NAD"). The NAD may be connected to a network to which a conference call server is connected, as well as to an instant messaging service adapted to communicate a conference call request to the conference call server. In particular, the instant messaging service may be adapted to communicate a request that a conference call be initiated, potentially including parameters associated with the desired call. The instant messaging service may be adapted to receive information in a tagged field format, such as HTML or XML, such that information contained in the message may be correctly parsed to allow the conference call server to properly initiate, or request initiation of, a conference call bridge.

When a conference call requester desires to initiate a conference call, the conference call requester may generate 106 a message (hereafter referred to as the "conference request message") to the conference server identifying parties who are potential participants ("potential targets") to a conference call. The potential call targets may be identified by an alias, such as a user name associated with the conference call targets in the conference call requester's NAD. Alternately, the information may be an alias identifying information associated with the potential targets stored in the conference server. Alternately, the potential targets may be identified by phone numbers or other addresses for the potential targets. Once the conference request message has been generated, the conference request message may be transmitted 108 from the NAD to the conference call server.

The conference request message may then be received 110 by the conference server. The conference server may parse 112 the received message to determine the address of the selected conference call targets. Parsing may involve stripping explicitly provided target phone numbers or VOIP addresses from the message, or converting aliases identified in a message. The conference call server may then initiate 114 or request initiation of a conference bridge between the conference call requester and the conference call targets.

Figure 2:
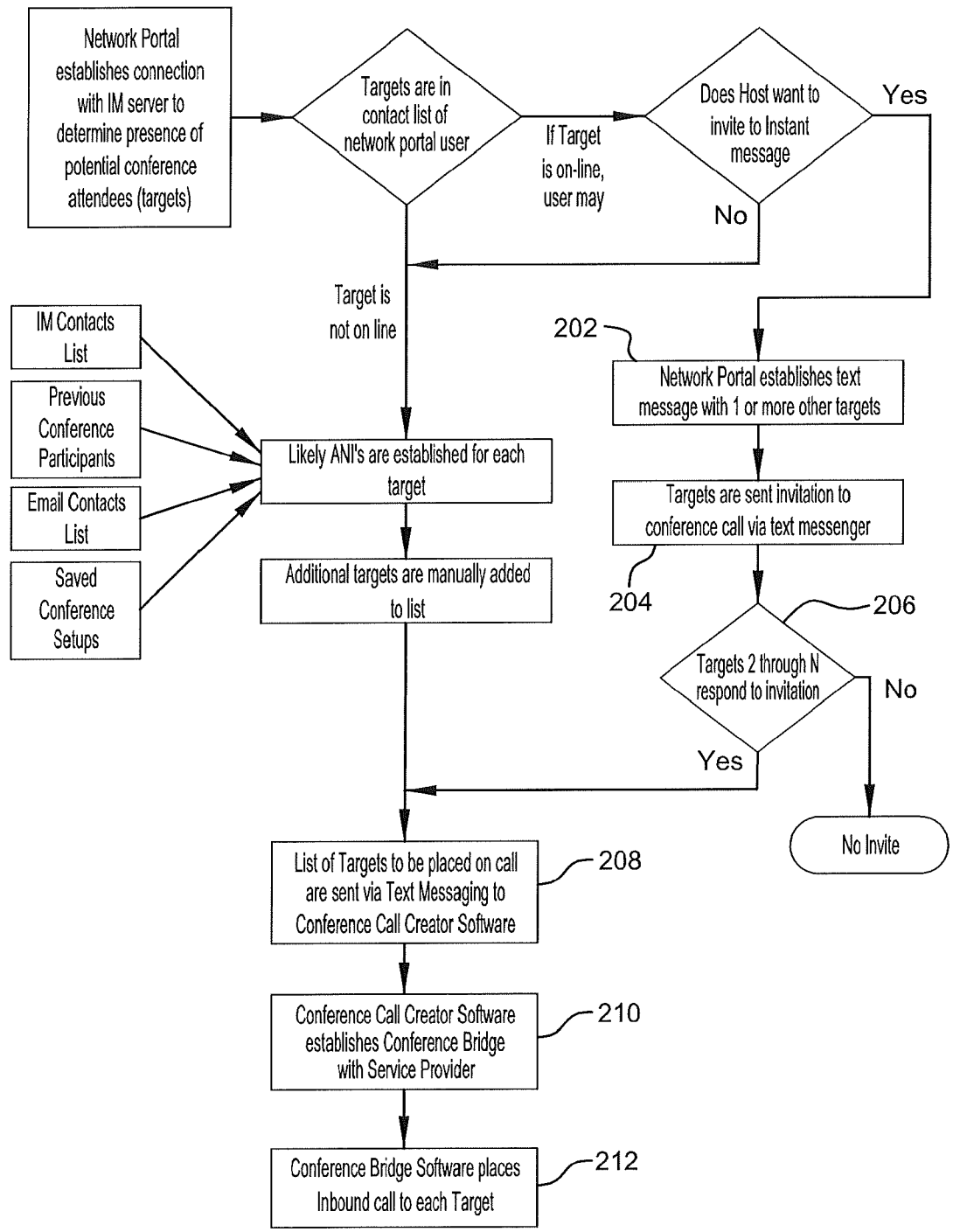
FIG. 2 shows a more comprehensive illustrative flowchart of the initiation of a conference call according to the present invention.

As may be noted in FIG. 1, the availability of conference call targets is not pre-determined in the simple process shown. As shown in FIG. 2, the instant messaging environment may be used to reduce the number of communications paths opened to unavailable or unwilling parties. In the process shown in FIG. 2, each of the conference call targets have an NAD in communication with an instant messaging service. Such a situation could arise where each of the targets are involved in a shared application session, with IM being used to provide a channel for communications outside the shared application session. In such a situation, the conference call server, which could be common with the shared application session server, could have a communications path 202 established with each of the NAD's associated with the conference call targets. When a conference call request is received by the conference server, the conference server may use the target identification portion of the message to determine the appropriate channel to the IM capability of the conference call target's IM software on their NAD, and generate 204 a conference request message to the conference call target or targets. The conference call targets could, upon receipt of the conference request message, decide 206 whether or not they desired to join the proposed conference call, and respond accordingly via their instant messaging software. The conference call server could then generate 208 a list of targets for the conference call, and then initiate 210 the conference call. As noted above, the initiation of the conference call may be accomplished by the forwarding of the list of attendees to conference call creator software, which could then initiate the conference call as discussed further below. Furthermore, conference bridges could be established for potential participants who are not connected through an instant messenger, although the potential then exists for the non-IM invitees to not be available to join a conference call.

Figure 3A:
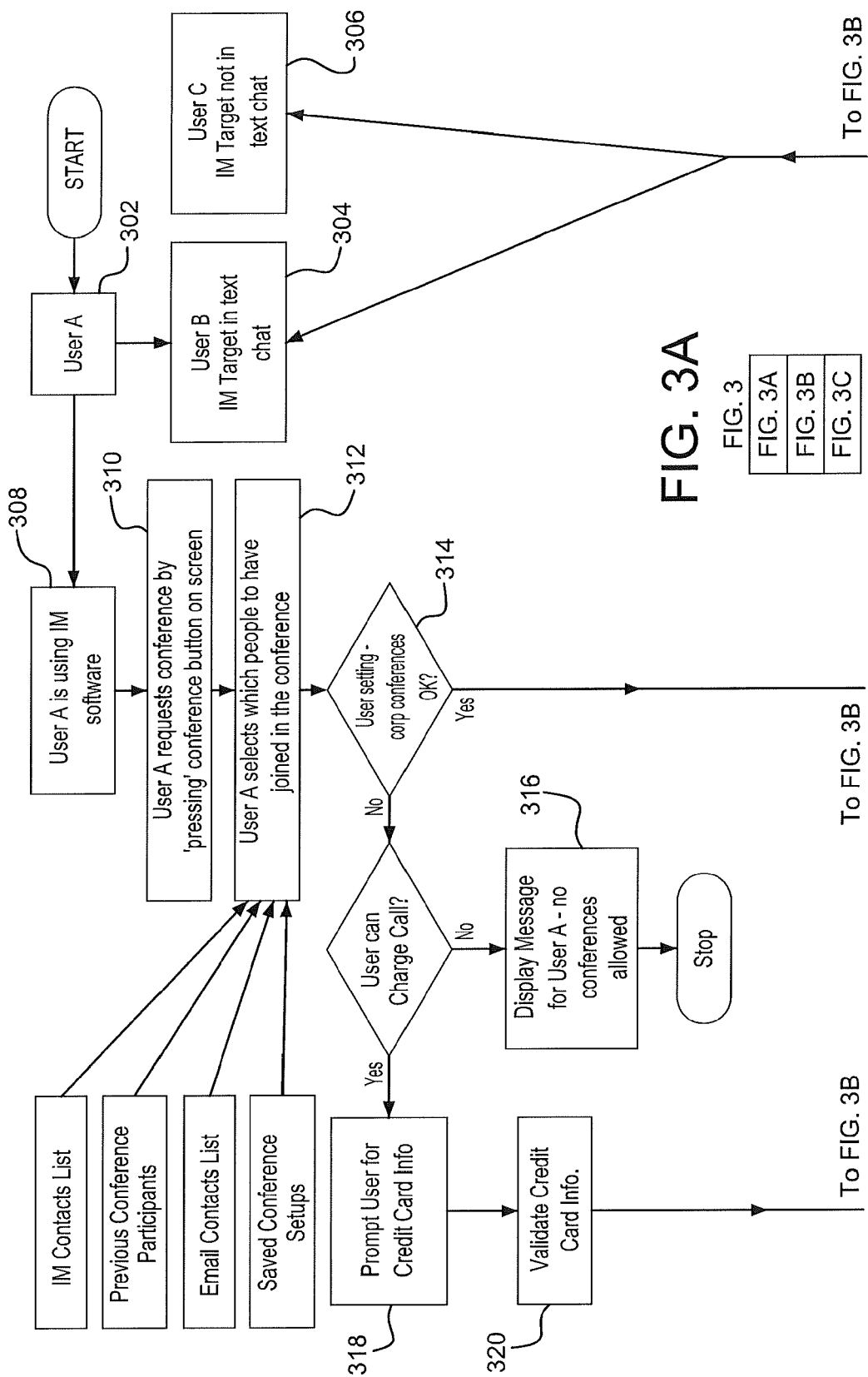
FIG. 3 shows a notional flowchart of the initiation of a conference call according to the present invention, in an environment in which each prospective caller has access to a network access device.
Figure 3B:
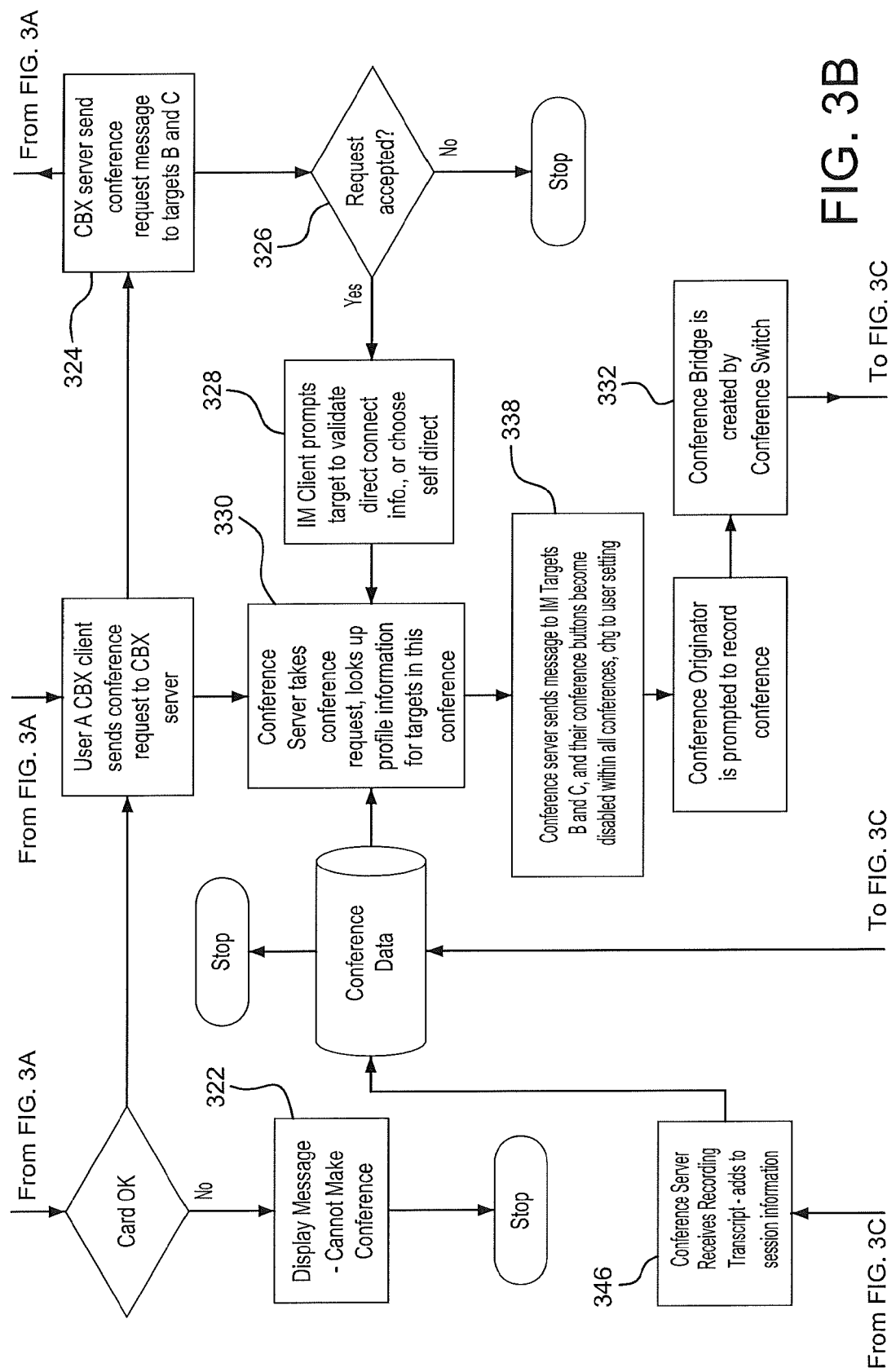
Figure 3C:
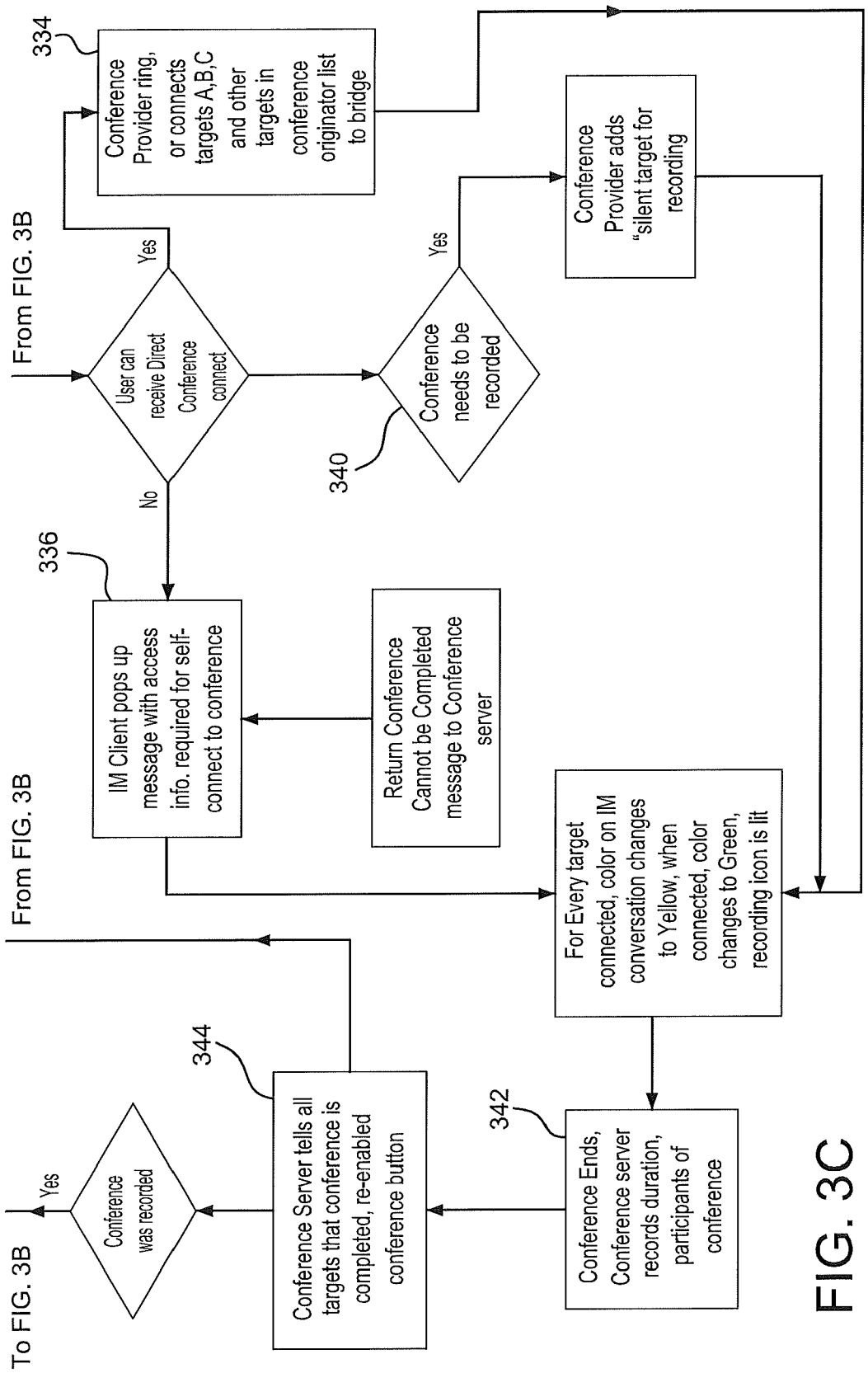

As shown in FIG. 3, a more robust embodiment of the present invention may be implemented to allow further functionality. For the purposes of illustration, the Figure shows three parties, User A 302, User B 304, and User C 306, involved 308 in an IM session, such as a chat session which could occur during a shared application session. User A 302, the conference call requester, could request a conference call through the NAD in use by User A. The IM service in communication with User A's NAD could be implemented to be aware of the on-going IM session, such that the software would determine the list of conference call targets from the list of parties presently in the IM session. Thus, User A could request a conference call with one step, such as through actuation of a "call now" button or icon associated with User A's IM service. Alternately, User A could be provided with a list of participants of the on-going IM session, and be provided 312 with the opportunity to add or remove potential participants from a planned conference call.

The conference call server in communication with User A's NAD may be provided with functionality for assessing charges associated with the conference call. A first step may be to determine 314 whether User A is a subscriber to a service providing the conference call server. If User A is not a subscriber to the service, User A may be informed 316 that he is not allowed to use the service. Although not shown, User A may be provided with the opportunity to subscribe to the service at this point. If User A is determined to be a subscriber, User A may be queried to provide information identifying a method for paying for the proposed conference call, such as through use of a credit card. Alternately, a charge account may be associated with a subscriber, such that once it is determined that User A is a subscriber, User A may be prompted to verify that the call should be charged to the associated account. Once User A has provided 318 charge information, the charge information may be verified 320. If it is determined that the charge information is invalid, User A may be so informed 322.

If it is determined that the charge information is valid, the conference call server may send 324 a conference call invitation to Users B and C. If Users B and C accept 326 the conference call invitation, the conference call server may prompt 328 Users B and C, via the IM functionality on their respective NADs, to verify their phone numbers for the conference call, or to provide information regarding calling them if no address information is available. The verification process may incorporate the use of information pre-stored in the conference call server for Users B and C, such that Users B and C may be prompted 330 with the pre-stored information to determine if it is correct, thus reducing the effort required for Users B and C to provide the necessary information to the conference call server.

The conference call server may then initiate a conference call bridge between the conference requester and the targets. If it is determined that, for each target, that direct dial calls are enabled, the conference bridge provider can dial 334 the direct dial number for the targets, connect to VOIP paths if VOIP connections are to be used, or may implement a combination of direct dialed and VOIP connections. If it determined that a target is not able to be direct dialed, the conference call server may send 336 an IM message to the non-direct dial target, providing a call-in number and passcode for the proposed conference call. Additionally, the conference call server may instruct 338 the NADs of the targets to disable any conference call request functionality while the present conference call is underway.

The conference call server may further utilize third party conference call providers for the actual initiation of a conference call based on parameters generated by the conference call server or the conference call requester. Various conference call providers may provide different functionality and/or rate structures. Functionality may include the ability to record a conference call, the ability to have listeners to the conference call (as opposed to parties with the ability to both listen and speak), the ability or inability to add or drop participants during a conference call, the ability to interactively mute a participant during a conference call, or the ability to provide video conferencing. Parameters associated with such choices may be provided for individual targets through target identity information provided to the conference call server, such as through the interface screen shown in FIG. 7, discussed further below.

Selection of conference call providers may also be determined based on rates associated with long distance charges which would be incurred as a result of the conference call, or based upon a preferred routing where VOIP paths are used. Different users may be in different regions geographically, such that different phone service providers would charge different amounts for the long distance aspect of the conference call. Thus, use of rate information in association with geographic information associated with conference call targets would allow minimization of long distance fees based on the geographic aspect of the conference call targets.

Where the conference call server initiates the conference call itself, the conference call server may use such geographic information to select specific long distance or data carriers for different conference call targets, again allowing minimization of the long distance, cost, or delay aspects. Such selections could include the selection of call repeaters at distant locations, to allow one communications service to forward the call into a geographic region, with a second service provider connecting to the conference call target. Such forwarding may be important where cellular or satellite paths are involved.

Conference call recording may also be implemented within the process, such that the requesting party can indicate 340 a desire to have a conference call recorded. If such a desire is received, the request that the call is to be recorded can be transmitted to Users B and C, such as via the IM channel, and User B and C acceptance of the recording be determined and recorded. Having the acceptance recorded may provide benefits at a later date, should the recording be challenged by a User claiming not to have known the call was being recorded.

Once the conference call is completed, the conference call server can record 342 the duration of the call, and assess appropriate charges to the designated account. If a conference call functionality was disabled during initiation of the conference call, the functionality that was previously disabled may be re-enabled 344. Furthermore, if the call was recorded, a transcript of the call may be generated 346 and forwarded to a relevant party.

Figure 4:
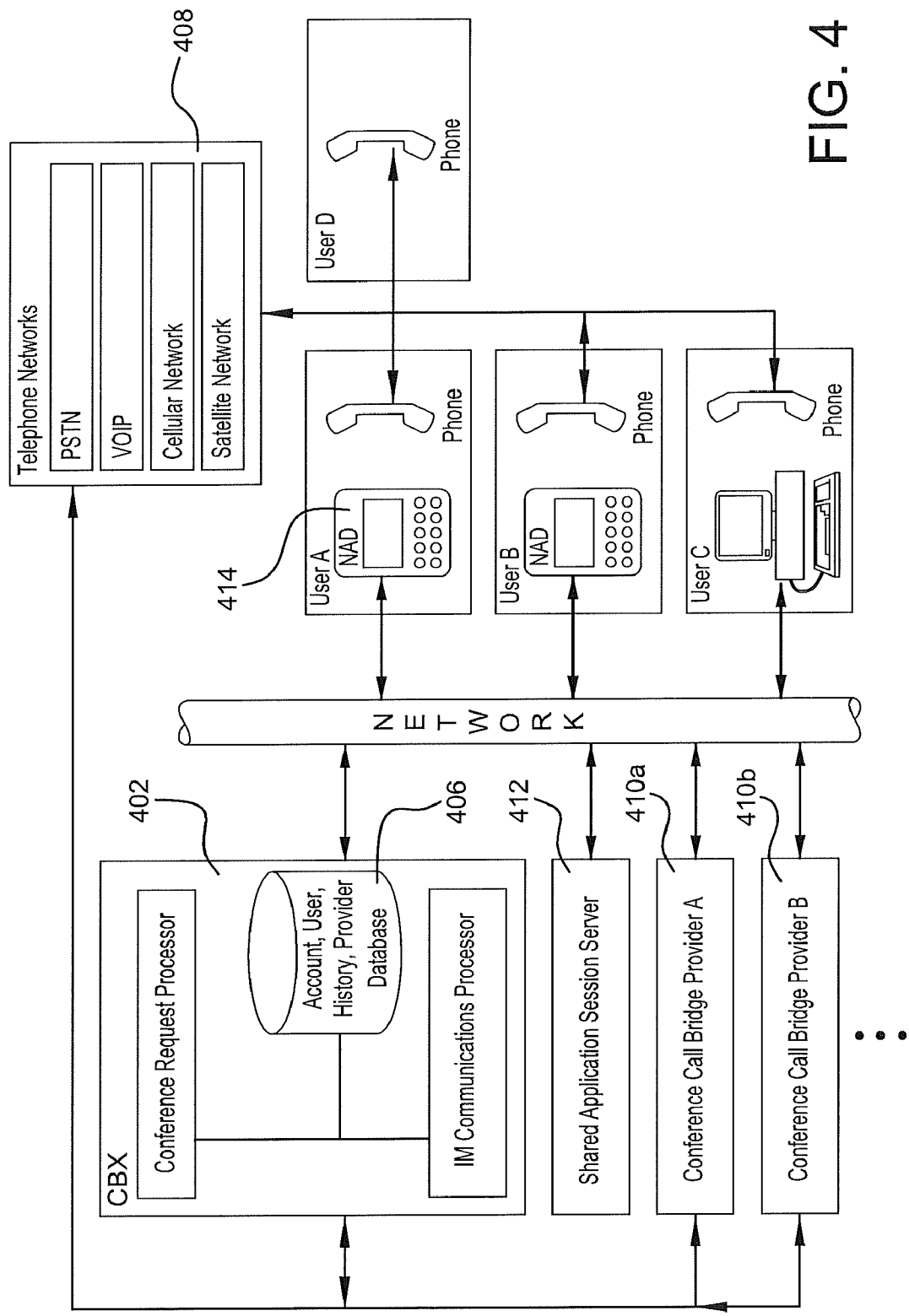
FIG. 4 illustrates a block diagram of a system for accomplishing the initiation of conference calls according to the present invention.

As shown in FIG. 4, a system for accomplishing the present invention may be implemented in a conference call server 402 connected to a network 404. The conference call server 402 may have a database 406 associated with the server 402 for storing account information, user information, and call management information, etc. Where one or more third party conference bridge providers may be used, information regarding the rate structures of the third party providers may be stored, to allow optimization of conference bridge provider selection. The conference call server may additionally be connected directly to a telephone network 408 or VOIP connection, or indirectly through a third party conference bridge 410*a*, 410*b*, . . . .

A shared application server may also be connected to allow information generated during a shared application session to be accessed by the conference call server as required, such as to determine a list of parties involved in a shared application session. Shared application sessions comprise the ability of multiple viewers to view the interface with a particular software application operating on a particular set of data, and may include the ability of each viewer to simultaneously operate the shared application. Such shared applications are discussed further in applicant's United States Patent Publication No. 20030018725, a.k.a. U.S. patent application Ser. No. 10/015,077, filed Oct. 26, 2001, the contents of which are herein incorporated in their entirety by reference thereto.

The users may be connected to the system via a network access device 414, which may be any network communicable device having the appropriate IM software service access. Although shown as a separate element, each user may also have telephonic capabilities 416 associated with the user. As discussed above, the telephonic capability may be implemented into the NAD, such as through a digital cell phone, or VOIP connection through a desktop or laptop computer connected to the network.

Figure 5:
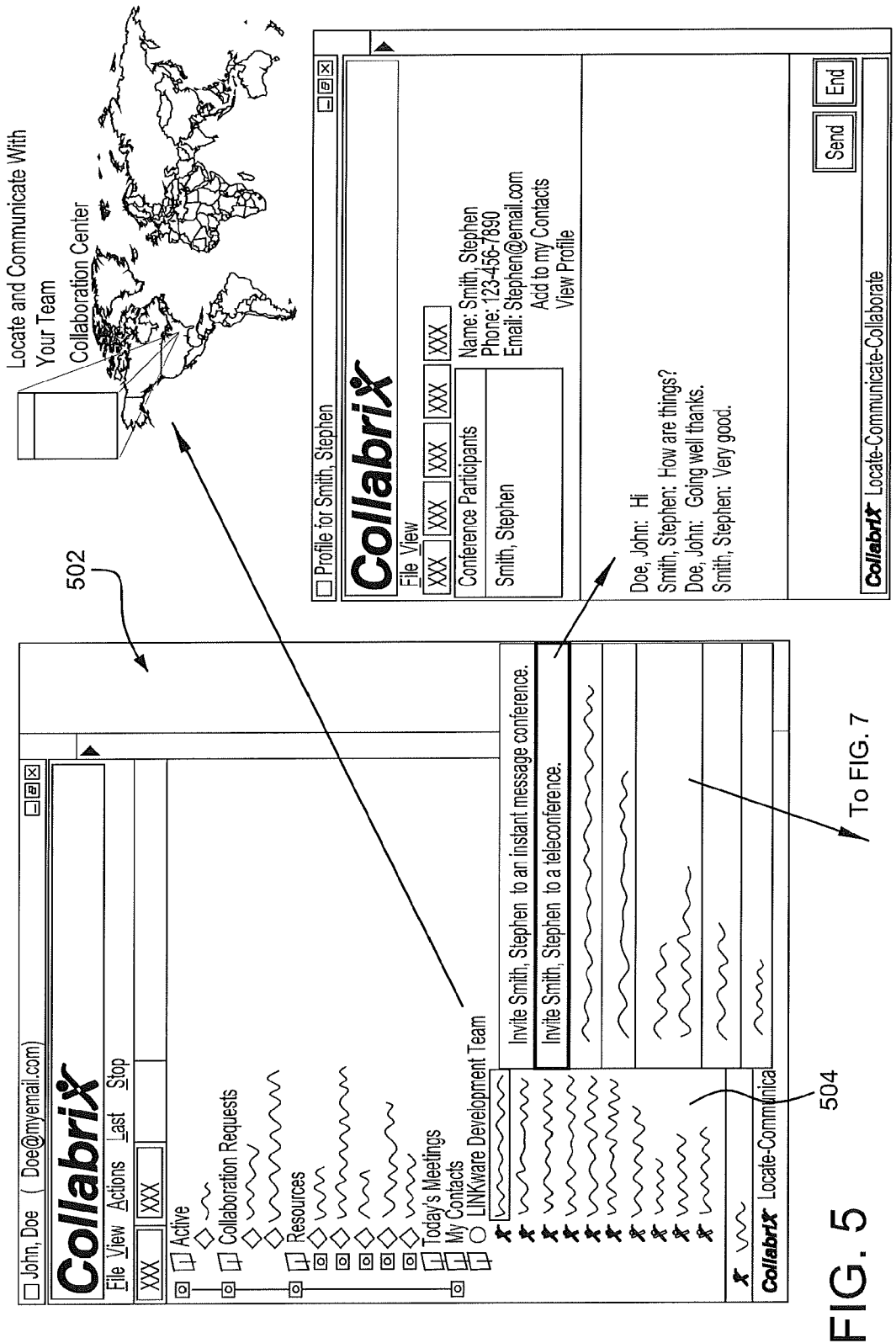
FIG. 5 illustrates a notional network access device display through which a conference call may be initiated.

As shown in FIG. 5, a display 502 may be generated on the NAD of a conference call requester to allow the conference call requester to invite potential participants to a proposed conference call, where IM is implemented on the potential participants NAD, or may allow a conference call requester to select targets to be called directly to be included in a proposed conference call where the conference call target is not provided with an IM capable NAD. An IM presence of some or all of the prospective target may be monitored by the IM server, such that the presence of prospective targets may be displayed for the conference call requester, such as by showing prospective targets who are not presently connected via IM to the conference server in a grayed display 504 with prospective target list, or by the display of present or not present flags on the display. Providing such information to the conference call requester may have the additional advantage of providing the conference call requester with information on which to base a decision of whether or not to request a conference call at a given time, based on prospective target availability.

Figure 6:
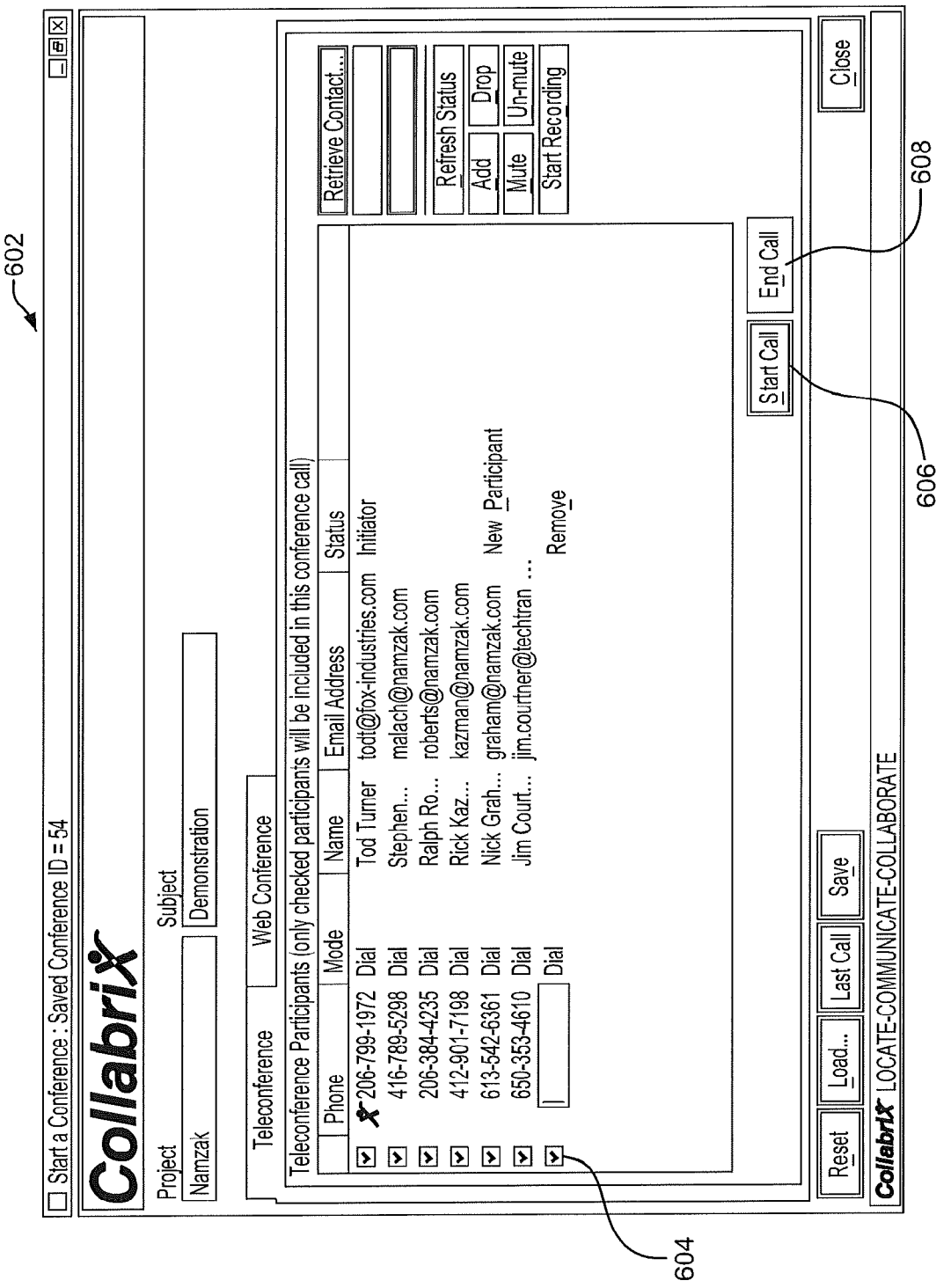
FIG. 6 shows a notional network access device display through which conference call targets may be selected.

FIG. 6 illustrates a notational information screen 602 for selecting prospective targets. The information screen 602 may include check boxes 604 to allow a conference call requester to designate potential targets that the conference call requester would like joined in a conference call, as well as a feature 606 allow the conference call requester to transmit information to the conference call server such that a conference call may be initiated. The information screen may also be provided with a feature 608 such that the conference call requester may be able to signal to the conference call server that an on-going conference call should be terminated.

Figure 7:
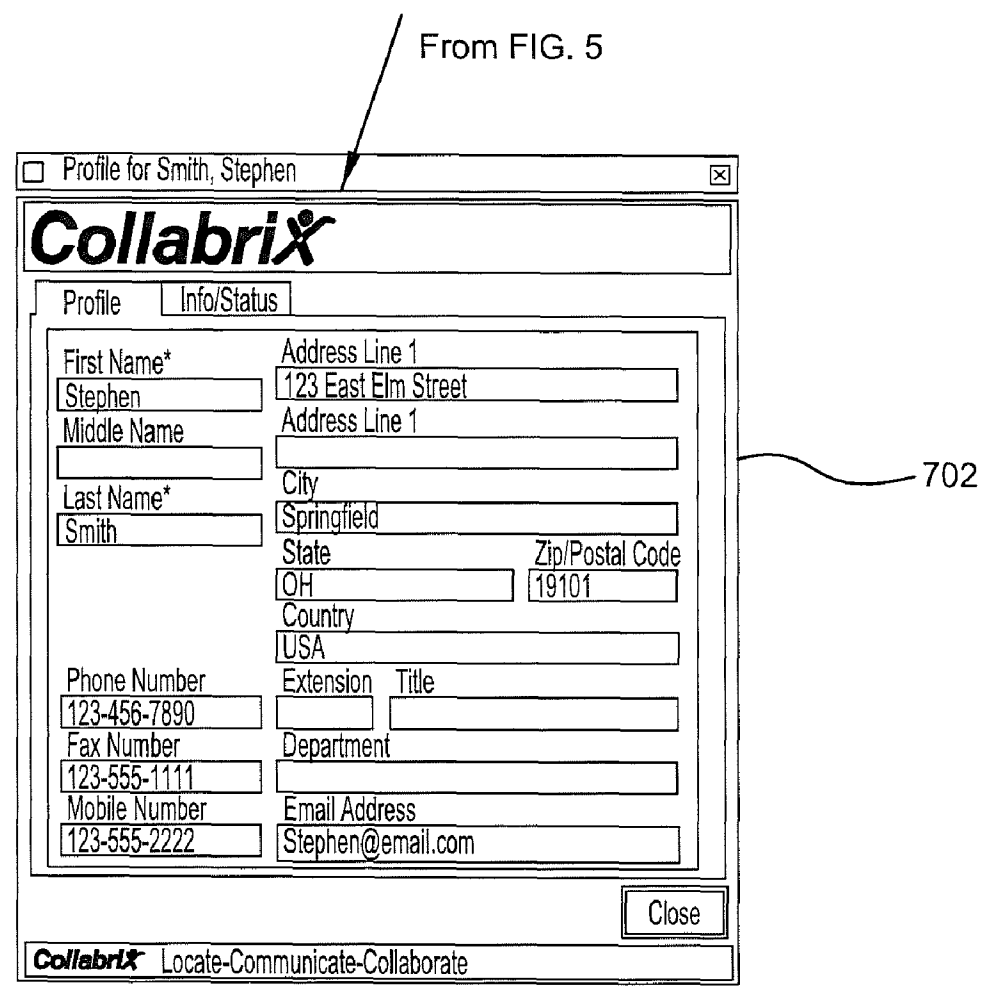
Figure 8:
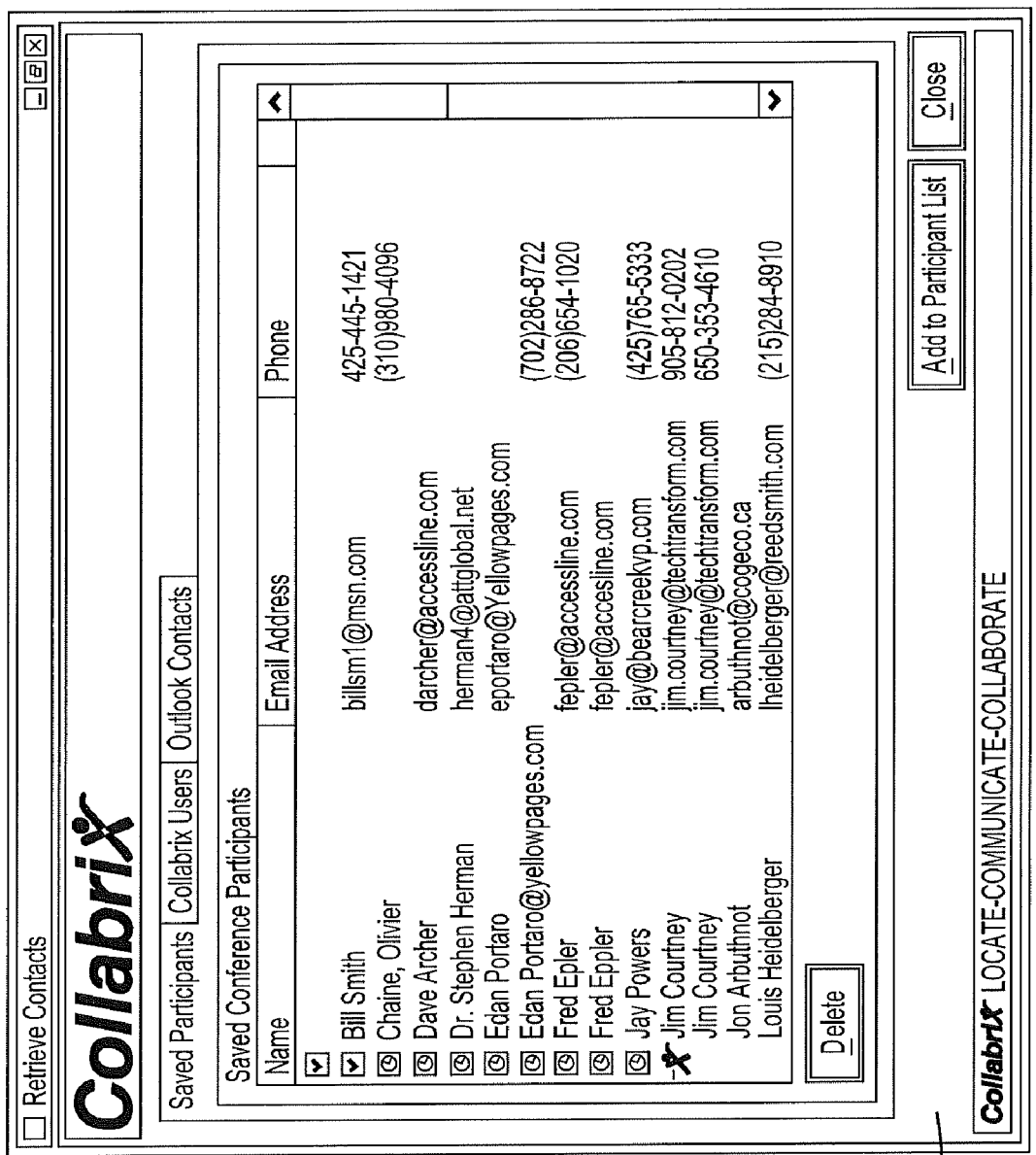
FIG. 8 shows a notional network access device display identifying targets previously involved in conference calls who are potentially available for a conference call, including identification of an availability status for each target where such potential target has an ongoing presence with the instant messaging service.

FIG. 7 illustrates a notional information screen 702 for querying and receiving parameters associated with a party. FIG. 8 shows a notional conference history display 802 for managing conference calls. Conference history information may be stored on the conference call server, such that the information may be accessible via an NAD.

Figure 9:
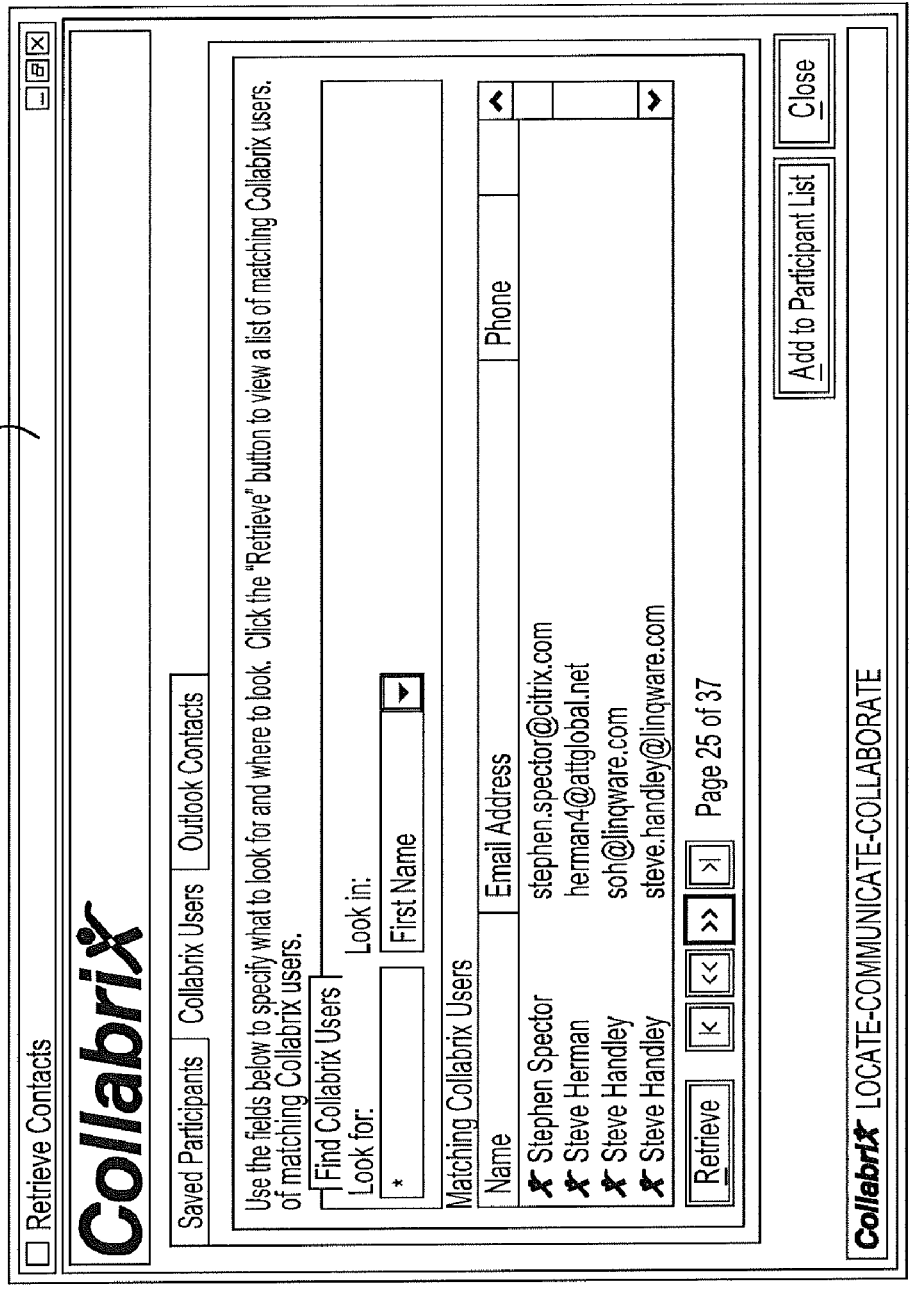
FIG. 9 shows a notional network access device display identifying targets previously involved in conference calls who are potentially available for a conference call, filtered to display potential targets having access to application sharing capabilities.

FIG. 8 illustrates a notional information screen 802 for allowing a conference call requester to select targets for a conference call from a list that has been filtered to only identify potential targets that have participated in previous conference calls. FIG. 9 illustrates a notional information screen 902 for allowing a conference call requester to select targets for a conference call from a list that has been filtered to only identify potential targets that have an application sharing capability through their network access devices.

Figure 10:
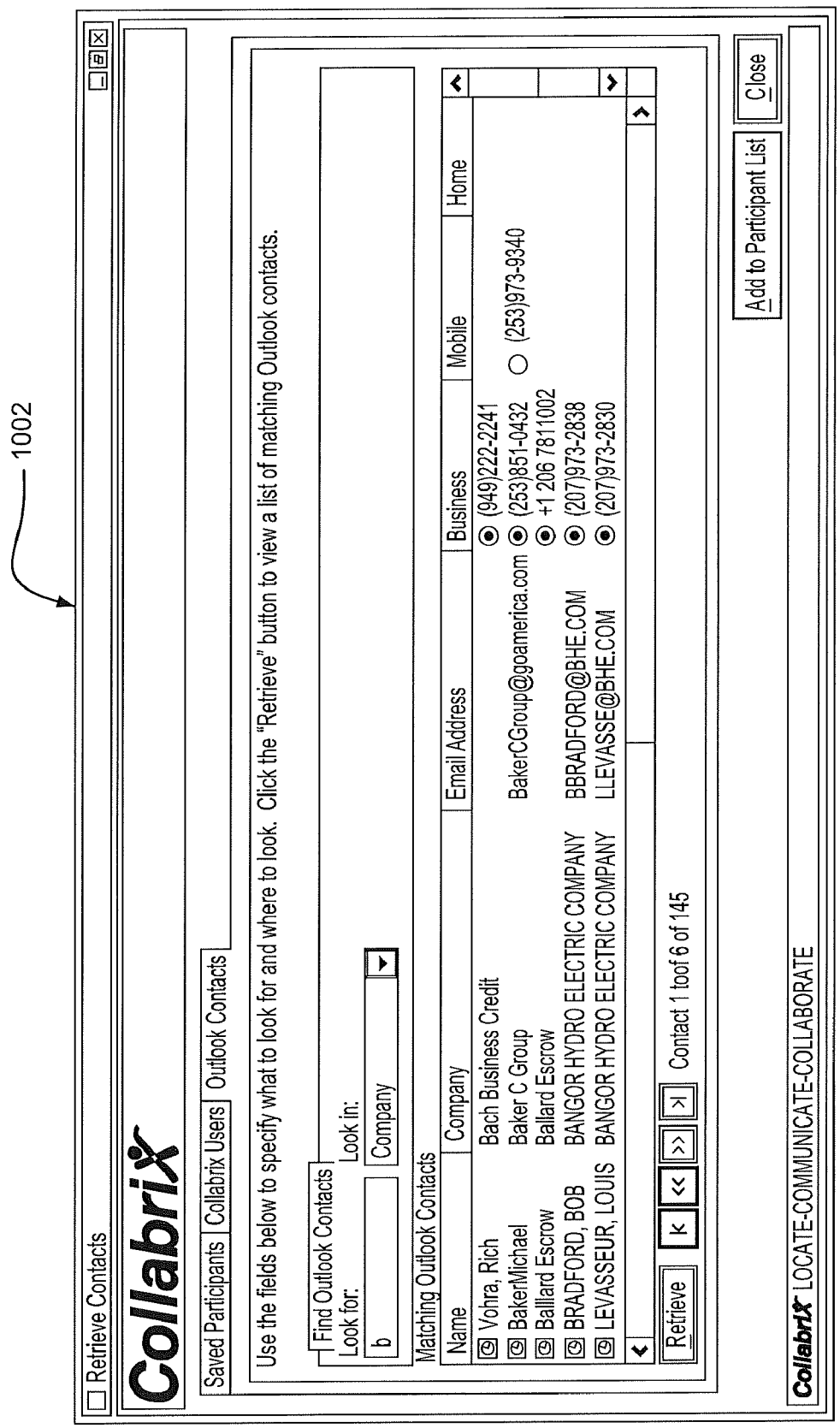
FIG. 10 shows a notional network access device display identifying targets previously involved in conference calls who are potentially available for a conference call, filtered to display only potential targets for which an e-mail client contact information is available.

FIG. 10 illustrates a notional information screen 1002 for allowing a conference call requester to select targets for a conference call from a list that has been filtered to only identify potential targets for which contacts are available in the conference call requester's e-mail application. Alternately, such contacts could be obtained from any application maintaining a contact list.

Figure 11:
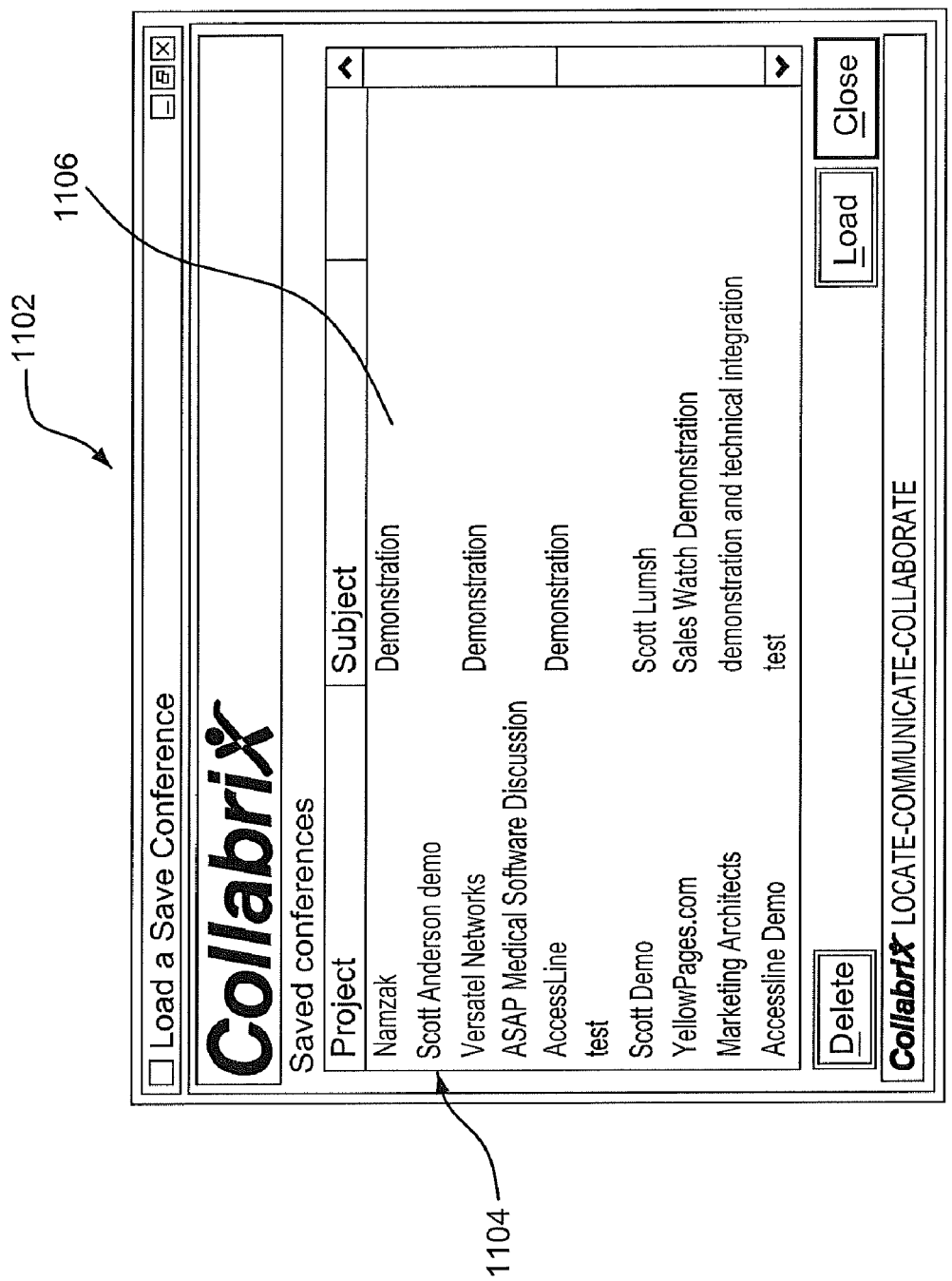
FIG. 11 shows a notional network access device display allowing retrieval of parameters associated with a previous conference call.

FIG. 11 illustrates a notional information screen 1102 to allow a conference call requester to retrieve parameters from a previous conference call. As a feature of the system, the conference call server may store identifying information regarding a previous conference call, including but not limited to, the addresses of participants, project identifying information 1104, and subject information 1106 for the prior conference call. This information may be displayed for the conference call requester to enable the conference call requester to recall and reuse parameters from the prior conference call.

Figure 12B:
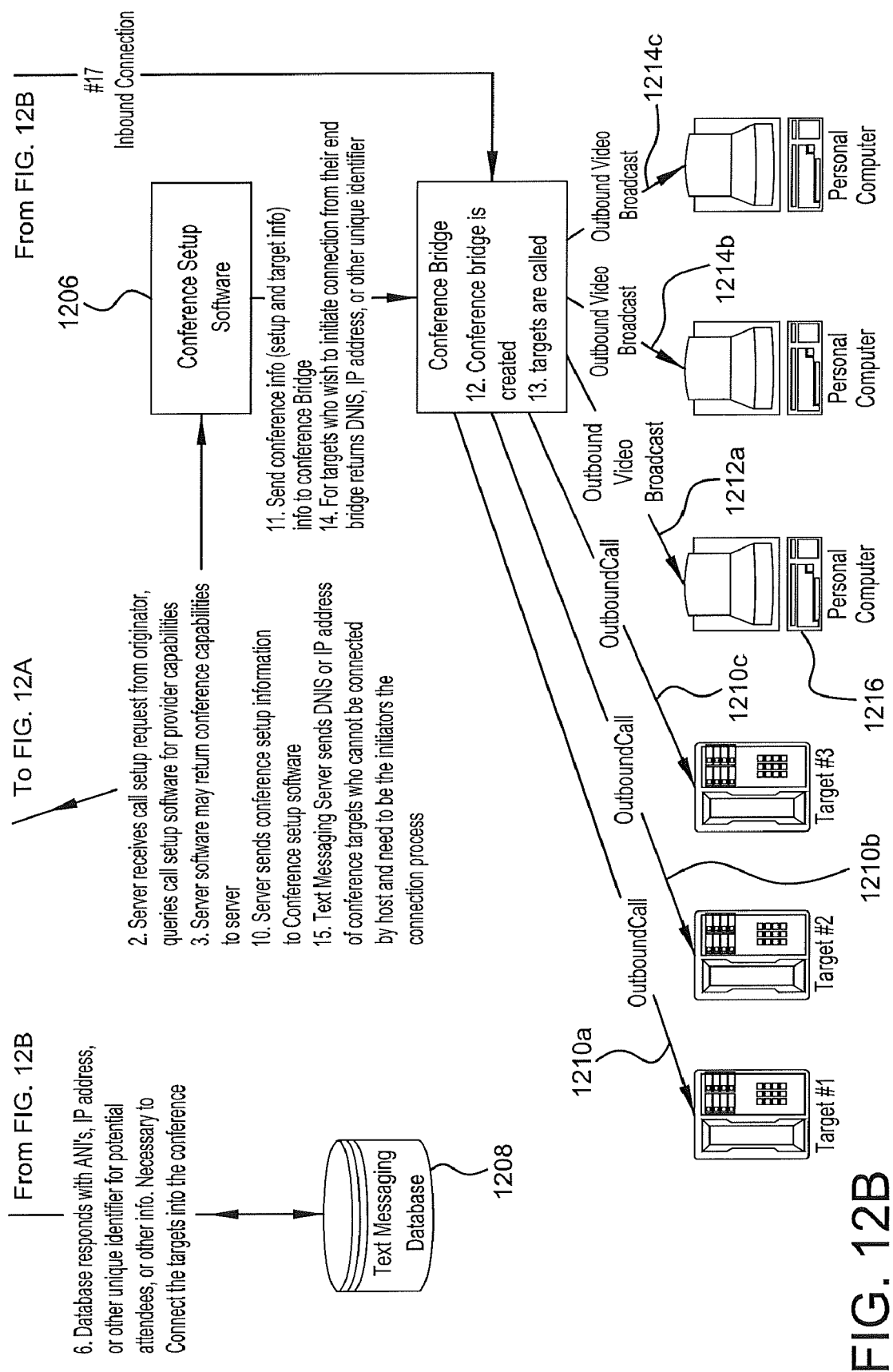
FIG. 12 shows an alternate system and process for initiating conference calls according to the present invention.

FIG. 12 illustrates an alternate system embodying the present invention. A text messaging server 1202 may be provided for coordinating IM text messaging between a conference call requester and one or more targets, shown as text messaging clients 1204*a*, 1204*b*, 1204*c*, and 1204*d*. The text messaging server may function concurrently as the conference call server, operating conference setup software 1206. The text messaging server 1202 may be connected through the conference setup software to a conference bridge 1208, either operated in conjunction with the text messaging server 1202, or maintained by a third party conference call service provider. The text messaging server 1202 may additionally be provided with access to a database 1208, either organically or remotely, to allow storage and retrieval associated with the instant messaging service, as well as the conference call service. The conference bridge may have several communications paths 1210*a*, 1210*b*, and 1210*c*, which allow the conference bridge to interconnect telephone lines to accomplish a conference call. Additionally, the conference bridge may be provided with network paths 1212a, 1212b, and 1212c, communicably connected to electronic devices such as personal computers 1214, to allow VOIP communications paths to be established to targets. The network paths are not restricted to VOIP protocols, but may alternately be used to provide videoconferencing capabilities, or the display of common visual displays for the participants to a conference call.

Figure 13:
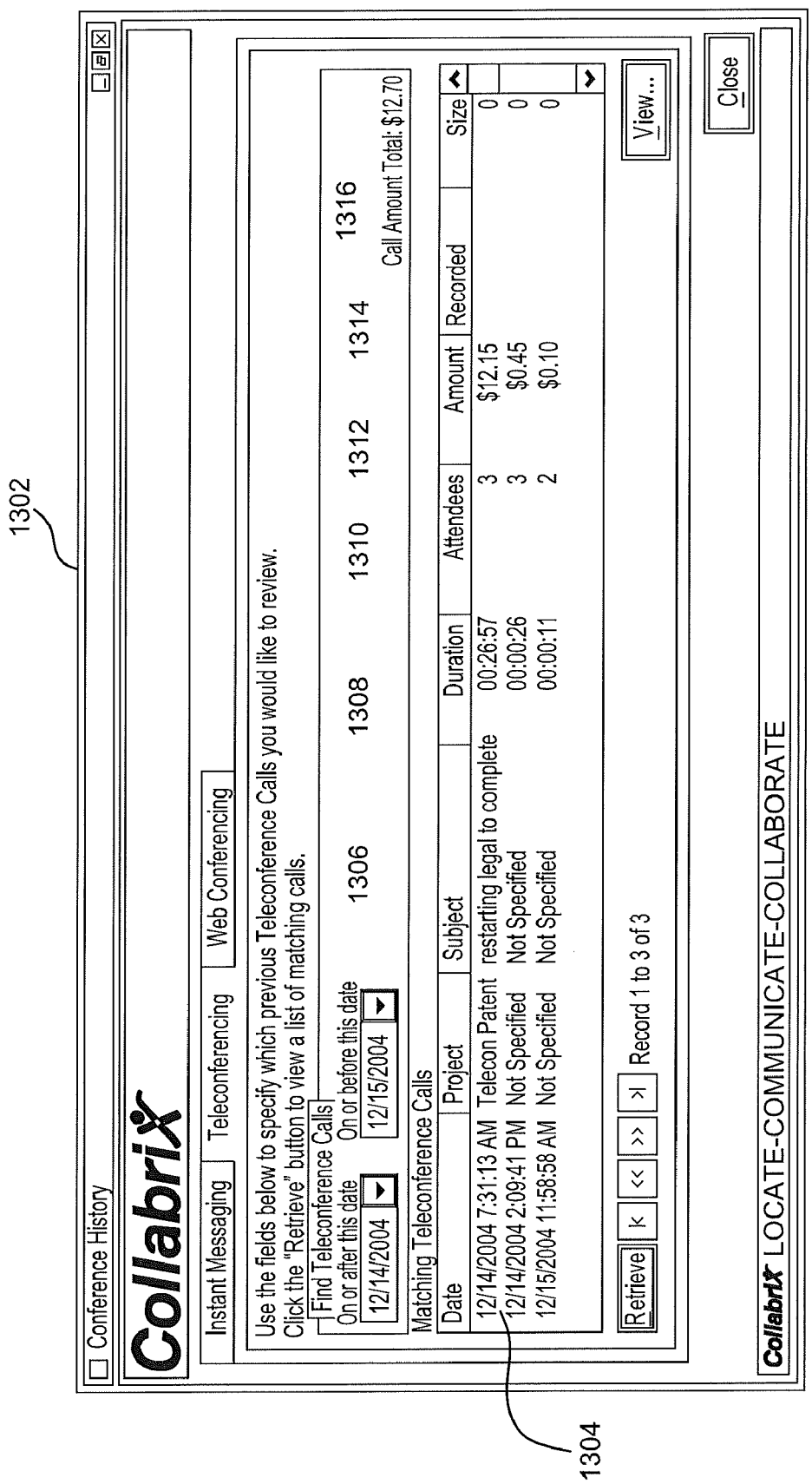
FIG. 13 shows a notional network access device display for displaying conference call management parameters to a conference call requester.

FIG. 13 illustrates a notional information screen 1302 displaying management parameters associated with a completed conference call, such as date information 1304, a project identifier 1306, a subject identifier 1308, durational information 1310, attendance information 1312, and costing information 1314. This information may be collected by the conference call server or third party conference call service provider, and stored by the conference call server to enable management of conference calls. Such information may also be retained to function as a record of prior conference call participant information. As noted above, an indicator 1316 may also be provided indicating whether a conference call was recorded for later playback or transcription.

Figure 14:
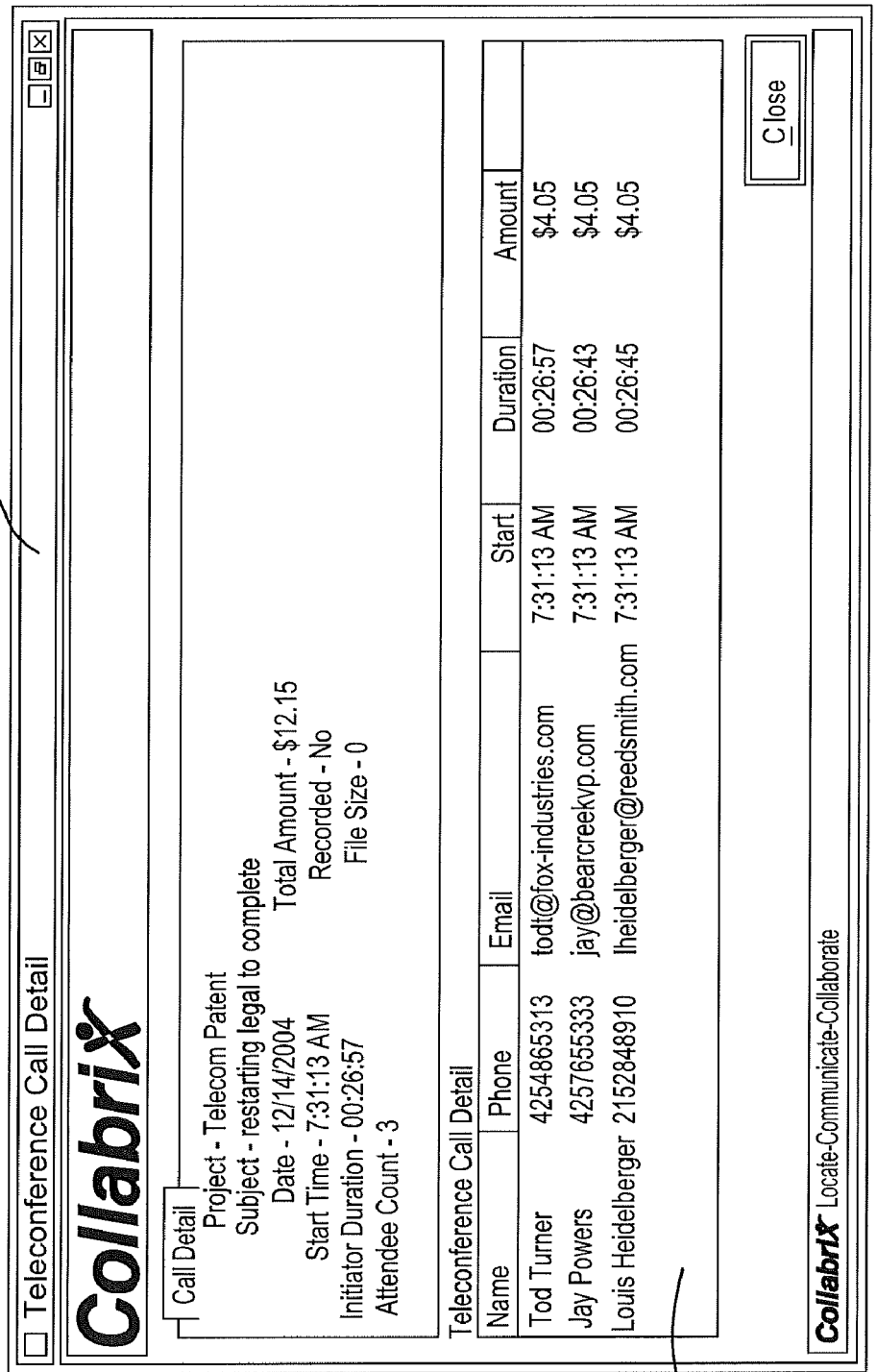
FIG. 14 shows a notional network access device display for displaying conference call management parameters associated with a particular conference call.

FIG. 14 shows a notional information screen 1402 showing management details associated with a prior conference call, such as could be drilled down from the display of FIG. 13. Individual participants 1404 of a prior conference call could be listed on such a display.

Figure 15:
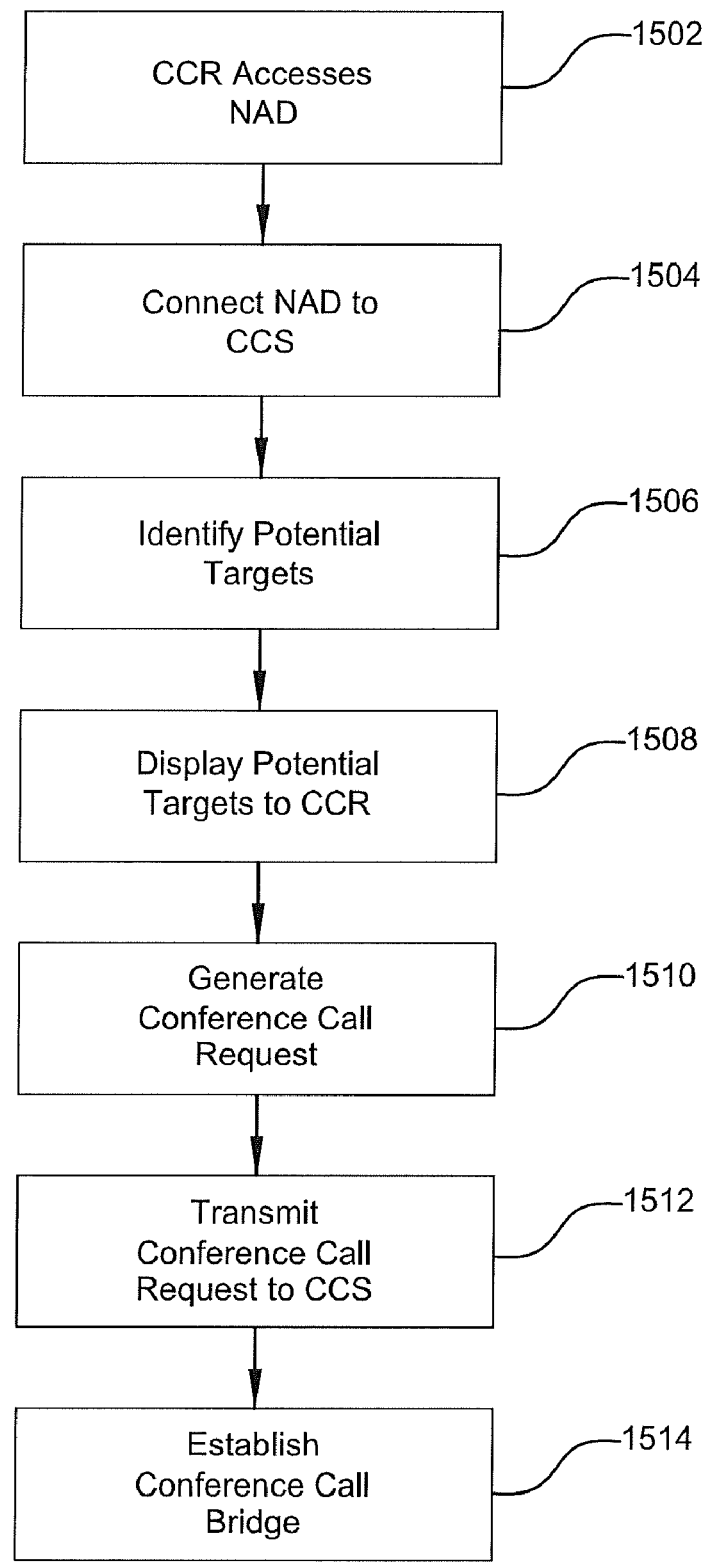
FIG. 15 shows an alternate process for initiating conference calls according to the present invention.

FIG. 15 illustrates an alternate process embodying the present invention, in which a conference call requester ("CCR") accesses 1502 a network access device ("NAD"), such as to be involved in a shared application session, or simply for the purpose of initiating a conference call. The CCR may then cause the NAD to be connected to a conference call server ("CCS") such as by entering an address into a web browser, or even by first creating a dial up connection to the Internet or CCS directly. Connection of the NAD to the CCS may cause the presentation of information regarding potential conference call targets on the NAD, such as through the displays discussed above. The CCR may select potential targets from the display, or manually add potential targets to a potential target list, to be included in a conference call request to be generated 1510 on and transmitted 1512 by the NAD to the conference call server, which may then initiate the conference call either directly or through a third party conference call service provider. Preferably, the conference call server or third party conference call service provider will identify optimized communications paths for the targets, and make connections from the conference call server or third party conference call service provider to the targets, interconnecting the related communications paths to form the conference call.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention can involve components having different characteristics as long as the principles of the invention are followed.

What is claimed is:

1. A method for initiating a conference call for a conference call requester using a network access device, the network access device communicating via an instant messaging service, the instant messaging service being adapted to communicate conference call request information with a conference call server, comprising:

indicating, at the network access device, a plurality of potential targets then being connected to the instant messaging service and participating in a given instant messaging session with the conference call requester;

generating a conference call request responsively to a single request by the conference call requester, said conference call request identifying each of the indicated potential targets; and transmitting the conference call request to the conference call server;

wherein, a conference call connection initiated by the conference call server and connected to the conference call requestor and each of the indicated potential targets is automatically established responsively to the transmitted conference call request.

2. The method of claim 1, wherein the instant messaging service comprises a software client active on said network access device.

3. The method of claim 1, wherein the instant messaging service comprises an Internet accessible application being communicably connected to said network access device via the Internet.

4. The method of claim 3, wherein the Internet accessible application comprises a browser viewable web page.

5. The method of claim 1, wherein the conference call connection utilizes a publicly switched telephone network.

6. The method of claim 1, wherein the conference call connection utilizes a voice over Internet protocol (VoIP) communications path.

7. The method of claim 1, wherein the conference call connection provides for video data transmission.

8. The method of claim 1, wherein the conference call connection utilizes a cellular communications path.

9. The method of claim 1, wherein the network access device further comprises an application sharing capability.

10. The method of claim 9, wherein the application sharing capability comprises an application sharing client installed on the network access device.

11. The method of claim 9, wherein the application sharing capability is integrated with the instant messaging service, the integration comprising functionality to allow a user to generate a conference call request via the instant messaging service from within the application sharing capability.

12. The method of claim 1, further comprising determining whether at least one potential target to a conference call is available for the conference call dependent upon the presence of an IM presence for the at least one potential target.

13. The method of claim 12, wherein the initiating the conference call comprises communicating information from the conference call server to a third party conference call service, the third party conference call service establishing a conference bridge between the call requester and the identified potential targets.

14. The method of claim 13, wherein the conference bridge selects between alternate communications paths at least partially dependent upon cost criteria.

15. The method of claim 14, wherein at least one of the alternate communications paths comprise a Voice over IP (VoIP) communications path.

16. The method of claim 15, wherein the conference bridge selects between alternate communications paths at least partially dependent upon performance criteria.

17. The method of claim 16, wherein at least one of the alternate communications paths comprise a Voice over IP (VoIP) communications path.

18. The method of claim 1, wherein the conference call request comprises addresses for the identified potential targets.

19. The method of claim 18, wherein at least one of the addresses comprises an automatic number identifier.

20. The method of claim 19, wherein at least one of the addresses comprises a voice over IP (VoIP) address.

21. The method of claim 1, wherein the network access device comprises a capability for communicating audio information via an Internet protocol connection.

22. The method of claim 1, wherein the network access device comprises a capability for communicating audio and visual information via an Internet protocol connection.

23. A method for initiating a conference call for a conference call requester using a network access device, the network access device communicating via an instant messaging service, the instant messaging service being adapted to communicate conference call request information with a conference call server, comprising:
- identifying a plurality of potential targets then being connected to the instant messaging service and participating in a given instant messaging session with the conference call requester;
- receiving, at the conference call server, a conference call request responsively to a single request by the conference call requester, said conference call request identifying each of the identified potential targets; and
- wherein, a conference call connection initiated by the conference call server and connected to the conference call requestor and each of the identified potential targets is automatically established responsively to the transmitted conference call request.

* * * * *